United States Patent [19]
Jurkevics et al.

[11] Patent Number: 5,978,463
[45] Date of Patent: Nov. 2, 1999

[54] RESERVATION SCHEDULING SYSTEM FOR AUDIO CONFERENCING RESOURCES

[75] Inventors: Andrew Jurkevics, Chappagua, N.Y.; Roger Teal, Wilmette; Timothy J. Reedy, Schamburg, both of Ill.

[73] Assignee: MCI WorldCom, Inc., Washington, D.C.

[21] Appl. No.: 08/844,571

[22] Filed: Apr. 18, 1997

[51] Int. Cl.[6] ................................................ H04M 3/56
[52] U.S. Cl. .......................... 379/202; 379/204; 379/205; 370/260; 370/261
[58] Field of Search ...................... 379/202, 203, 379/204, 205, 206; 370/260, 261, 262, 263

[56] References Cited

U.S. PATENT DOCUMENTS

| | | | |
|---|---|---|---|
| 4,796,293 | 1/1989 | Blinken et al. | 379/202 |
| 5,099,510 | 3/1992 | Blinken, Jr. et al. | 379/202 |
| 5,136,581 | 8/1992 | Muehrcke | 379/202 |
| 5,483,587 | 1/1996 | Hogan et al. | 379/202 |
| 5,483,588 | 1/1996 | Eaton et al. | 379/202 |
| 5,539,813 | 7/1996 | Jonsson | 379/202 |
| 5,546,449 | 8/1996 | Hogan et al. | 379/202 |
| 5,572,582 | 11/1996 | Riddle | 379/202 |
| 5,619,555 | 4/1997 | Fenton et al. | 379/202 |
| 5,668,863 | 9/1997 | Bieselin et al. | 379/202 |
| 5,719,928 | 2/1998 | Pinnell et al. | 379/202 |
| 5,812,652 | 9/1998 | Jodoin et al. | 379/202 |
| 5,812,653 | 9/1998 | Jodoin et al. | 379/202 |

*Primary Examiner*—Scott Wolinsky

[57] ABSTRACT

An automated scheduling system schedules audio conferences for an audio conferencing system. The scheduling of an audio conference results in the reservation of audio conferencing resources for a designated time frame. The automated scheduling system identifies what audio conferencing resources are available during the designated time frame and then chooses optimal ones of the audio conferencing resources to achieve load balancing and to prevent overflow of an audio conference between conferencing bridges. A scoring mechanism may be applied to identify the optimal audio conferencing resources for a given audio conference. The automated scheduling system is capable of operating in real-time so that a caller that requests the scheduling of an audio conference may receive confirmation and a phone number to call to participate in the audio conference during a single phone call. The automated scheduling system may also schedule a recurring series of audio conferences that occur at periodic intervals with common participants.

35 Claims, 14 Drawing Sheets

800 Number Pool 110

| 800 Phone Number | Pool Type |
|---|---|
| 800-XXX-XXXX | Regular |
| 800-YYY-YYYY | Crisis |
| 800-ZZZ-ZZZZ | Recurring |
|  |  |

*Fig. 10*

Toll Phone Pool 112

| Phone Number | Pool Type |
|---|---|
| XXX-XXX-XXXX | Regular |
| YYY-YYY-YYYY | Crisis |
| ZZZ-ZZZ-ZZZZ | Recurring |
|  |  |

*Fig. 11*

VNET Number Pool 114

| VNET Number | Pool Type |
|---|---|
| XXX-XXXX | Regular |
| YYY-YYYY | Recurring |
| | |

132 — VNET Number; 134 — Pool Type; 136 — Regular; 138 — Recurring

*Fig. 12*

| Phone Number 142 | 1:15PM 144 | 1:30PM 146 | 1:45PM 148 | 2:00PM 150 |
|---|---|---|---|---|
| XXX-XXX-XXXX | Scheduled | Scheduled | Available | Available |
| | | | | |

Time

Time Buffer 140

*Fig. 13*

RESERVATION SCHEDULING SYSTEM FOR AUDIO CONFERENCING RESOURCES

TECHNICAL FIELD

The present invention relates generally to telecommunication systems and, more particularly, to a reservation scheduling system for audio conferencing resources.

BACKGROUND OF THE INVENTION

Audio conferencing facilities have become increasingly popular. These facilities provide the necessary resources for callers at different locations to enter and participate in an audio conference. Typically, audio conferencing is performed via a call center that includes agents situated at consoles to facilitate the audio conferencing. The call center may also provide conferencing bridges for facilitating audio conferences.

One of the difficulties faced by conventional audio conferencing systems is the scheduling of audio conferences. The scheduling has typically been manually performed and has been quite cumbersome. The scheduling of the audio conferences is both labor intensive and time consuming. Typically, a party organizing an audio conference must wait a substantial amount of time before receiving a confirmation that the audio conference has been scheduled and a phone number that may be called for participants to enter the audio conference.

SUMMARY OF THE INVENTION

The present invention addresses the limitations of the prior art by providing an automated reservation scheduling system for audio conferencing resources. The reservation scheduling system schedules conference calls in realtime in a way that optimally makes use of audio conferencing resources. As a result, a party scheduling an audio conference may receive a confirmation and a conferencing phone number on the same call that the parties use to initiate the scheduling of a conference. The automated reservation scheduling system reserves audio conferencing resources to ensure that a sufficient amount of resources are available for the scheduled time slot in which the audio conference is to take place. The resources are reserved based upon a determination of the resources that will be required to realize the audio conference requested by the requesting party.

In accordance with a first aspect of the present invention, a method of reserving audio conferencing resources for an audio conferencing system is practiced in a computer system. In accordance with this method, an automated scheduler is provided for scheduling reservations of the audio conferencing resources. A request is received from a caller to schedule an audio conference. The automated scheduler is then used to identify selected ones of the audio conferencing resources to be used in the audio conference. The selected audio conference resources are then reserved for use in the audio conference.

In accordance with another aspect of the present invention, a method is practiced in a computer system such that a request to schedule an audio conference at a given date and time is received. The audio conference has certain constraints. Audio conferencing resources within an audio conferencing system are examined to determine available audio conferencing resources at the given date and time. The available audio conferencing resources that fulfill the constraints of the audio conference are identified as qualified audio conferencing resources. Some of the qualified audio conference resources are selected as the ones to be reserved for the audio conference.

In accordance with a further aspect of the present invention, a request to schedule a first audio conference is received on a computer system. A phone number that participants in the first audio conference may call to participate is determined and reserved. Audio conferencing resources to be used for the first audio conference are determined and reserved independently of the determining of the phone number for the first audio conference. A second request to schedule a second audio conference is received. A phone number and audio conferencing resources to be used for the second audio conference are determined and reserved interdependently. The determining of the phone number determines the audio conferencing resources to be used for the second audio conference.

In accordance with an additional aspect of the present invention, an automated scheduler is provided for scheduling reservations of audio conferencing resources for audio conferences in an audio conferencing system. A request is received to schedule a series of recurring audio conferences that occur at periodic intervals with common participants. The series of recurring audio conferences are scheduled with the automated scheduler such that the audio conferencing resources are reserved for the series of recurring audio conferences.

BRIEF DESCRIPTION OF THE DRAWINGS

A preferred embodiment of the present invention will be described below relative to the following figures.

FIG. 10 illustrates the format of the 800 number pool.

FIG. 11 depicts the format of the toll phone pool.

FIG. 12 depicts the format of the VNET number pool.

FIG. 13 depicts the time buffer for a phone number.

DETAILED DESCRIPTION OF THE INVENTION

The preferred embodiment of the present invention provides an automated reservation scheduling system for audio conferencing resources. The reservation scheduling system of the preferred embodiment is implemented in software in a client/server environment. The reservation scheduling system operates in real-time and is able to respond to a caller's scheduling request in a single call. Thus, during a single call, a caller may initiate the scheduling request, receive confirmation that the requested audio conference has been scheduled and receive a phone number for participants to call to participate in the audio conference. Since the scheduling system is automated, it is substantially less labor intensive than conventional approaches and manual scheduling approaches. Moreover, the scheduling system includes internal logic for choosing optimal resources to reserve for an audio conference based upon time of the scheduled audio conference and based upon the nature of the audio conference being scheduled.

Figure 1:
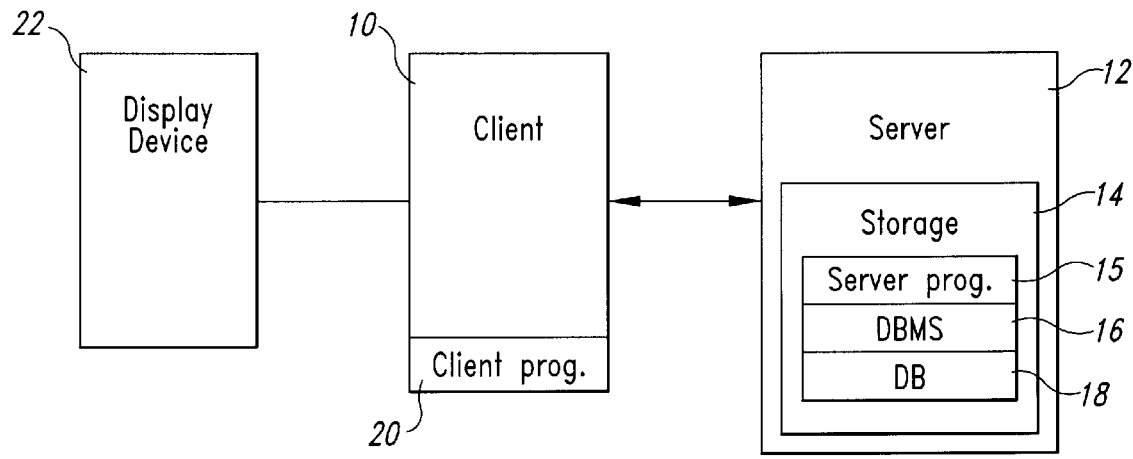
FIG. 1 is a block diagram showing a computer architecture that is suitable for practicing the preferred embodiment of the present invention.

FIG. 1 is a block diagram that illustrates a computing environment that is suitable for practicing the preferred embodiment of the present invention. A client computer system 10 is in communication with a server computer system 12 via a communication link. This communication link may be implemented as part of a local area network (LAN), a wide area network (WAN), or other connection network. The server 12 includes storage 14 that may include both primary storage and secondary storage. The secondary storage may include computer-readable media such as storage disks and CD-ROMs. The storage 14 holds a server program 15 for the reservation system, a database management system (DBMS) 16 and a database 18. A suitable server 12 for practicing the preferred embodiment of the present invention is a server based upon the DEC Alpha processor from Digital Equipment Corporation. The DBMS 16 may be the Oracle RDBMS 7.XX relational database system from Oracle Corporation. As will be described in more detail below, the database 18 holds the schedule of audio conferences and a number of tables that are utilized by the reservation system.

The client computer system 10 includes a client program 20 for the reservation system. The client computer system 10 may run on a personal computer or workstation and may provide logic for a reservationist (i.e., an agent in a call station) to submit scheduling requests to the server 12. The client computer system 10 may include a display device 22 for displaying windows produced by the client program 20 as part of a user interface. Requests submitted from the client program 20 are processed by the server program 15 of the reservation system.

Figure 2:
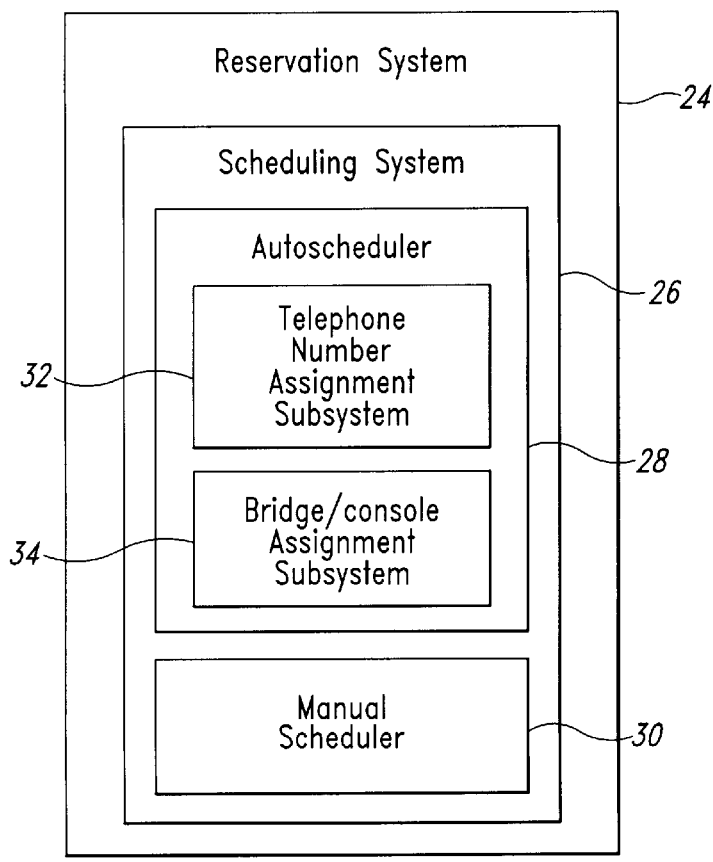
FIG. 2 is a logic diagram illustrating components of the reservation system of the preferred embodiment of the present invention.

FIG. 2 depicts the logical organization of the reservation system 24 of the preferred embodiment of the present invention. The reservation system 24 generally includes code for receiving reservation requests, generating reports and performing other related functionality. The preferred embodiment of the present invention focuses on the scheduling system 26 of the reservation system. The scheduling system is responsible for scheduling reservations of audio conferencing resources, including phone numbers, trunk groups and consoles. The scheduling system 26 is divisible into an auto-scheduler 28 and a manual scheduler 30. The auto-scheduler is an automated scheduling system run on a computer system for scheduling audio conferencing requests that chooses what resources and phone numbers to use. The manual scheduler 30, in contrast, enables a reservationist to manually select and enter phone numbers and resources for an audio conference. The auto-scheduler, 28, on the other hand, includes program logic for selecting the resources to be used. The auto-scheduler 28 may be divided into two additional subsystems: the telephone number assignment subsystem 32 and the bridge/console assignment subsystem 34. The telephone number assignment subsystem 32 assigns telephone numbers that may be utilized by participants to enter an audio conference. The bridge/console assignment subsystem 34 is responsible for assigning conferencing bridges and consoles to audio conferences.

Figure 3:
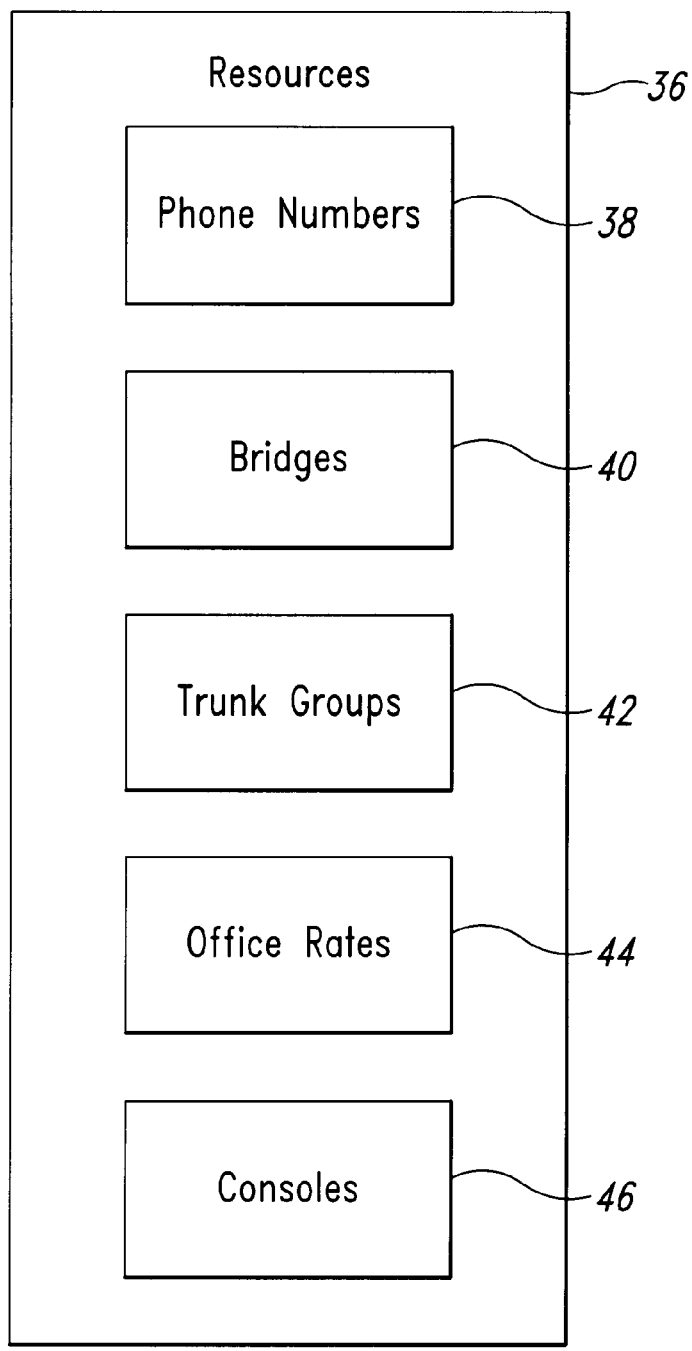
FIG. 3 is a diagram illustrating what resources are scheduled by the reservation system.

Before continuing the discussion of the preferred embodiment of the present invention, it is helpful to review resources of interest to the auto-scheduler 28. In general, the auto-scheduler 28 reserves lines on a trunk group. These lines are found on a conferencing bridge that is part of an office route, as will be described in more detail below. FIG. 3 depicts resources 36 that are of interest to the auto-scheduler 28. Phone numbers 38 are of interest to the auto-scheduler 28. Phone numbers must be assigned by the auto-scheduler 28 so as to ensure that the phone number to participate in a conference is not already dedicated to another audio conference. As will be described in more detail below, different varieties of phone numbers (e.g., toll phone numbers, 800 phone numbers and private network (VNET) phone numbers) may be assigned for an audio conference.

Conferencing bridges 40 and trunk groups 42 are also of interest to the auto-scheduler 28. "Trunk groups" are the physical groupings of phone lines on a bridge which hunt together. Office routes 44 are of interest to the autoscheduler 28. An "office route" is a user-defined hunt group within a switch. Each office route may have one or more trunk groups. Office routes provide the ability for an audio conference to span multiple bridges. It should be appreciated that the conference bridges are typically included within a single ACD or other switching mechanism. Lastly, the auto-scheduler is concerned with consoles 46, which are the computer terminals connected to a bridge that are used to coordinate or set up audio conferences.

The relationship between bridges, trunk groups, office routes and consoles is exploited by the auto-scheduler 28. A trunk group is confined to a single bridge. Thus, if an audio conference is assigned to a trunk group, the assignment also results in the auto-conference being assigned to the corresponding conference bridge on which the trunk group resides. Office routes are always accessed via a specific lead trunk group. This lead trunk group is the first bridge in the office route. As a result, a trunk group assignment also results in the assignment of the conference to a specific office route. Consoles are assigned to specific conferencing bridges. As a result, the assignment of an audio conference to a particular bridge results in the assignment of the audio conference to a subset of possible consoles.

Figure 4:
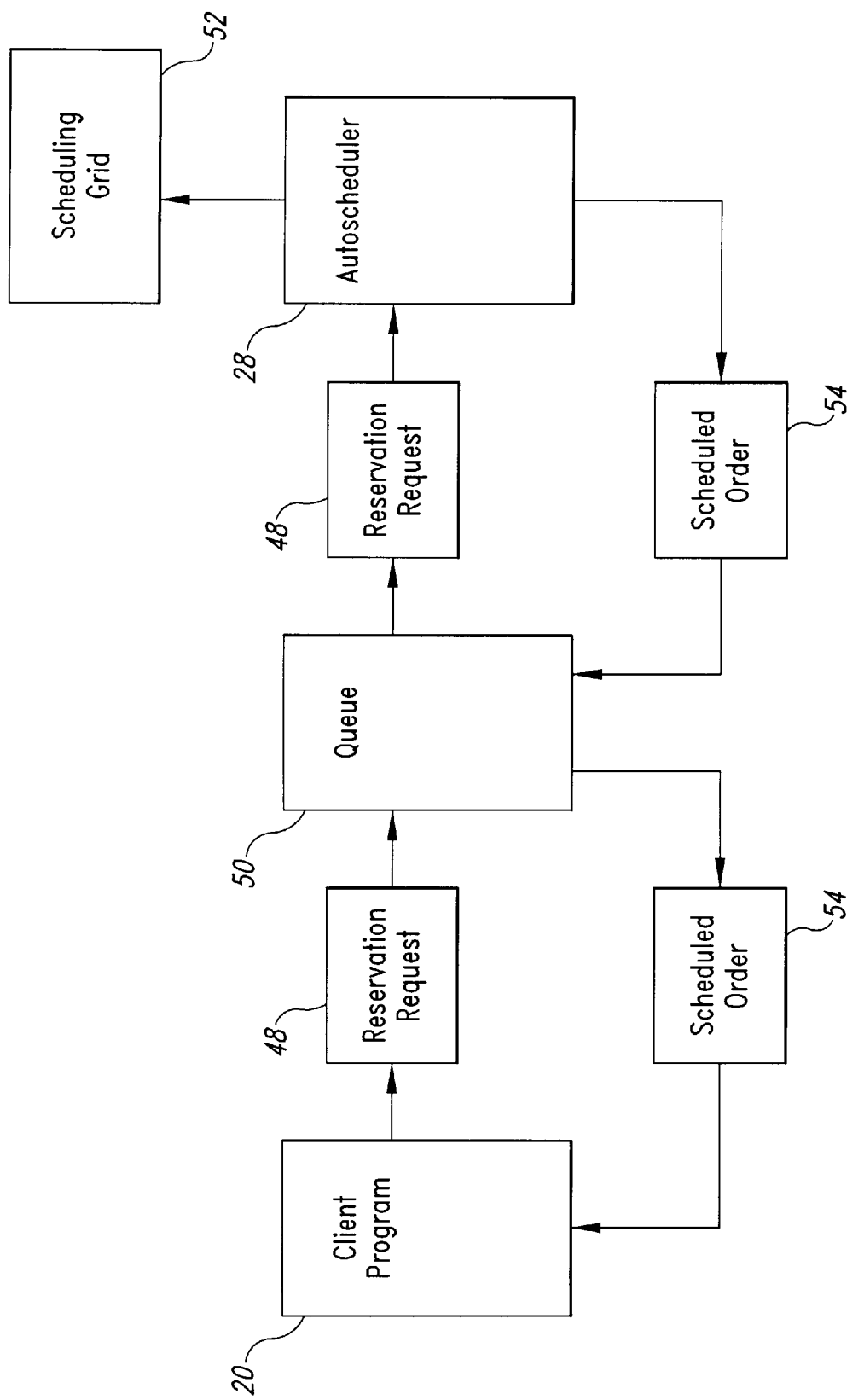
FIG. 4 is a block diagram that illustrates the flow of reservation requests and schedule orders in the preferred embodiment of the present invention.
Figure 5:
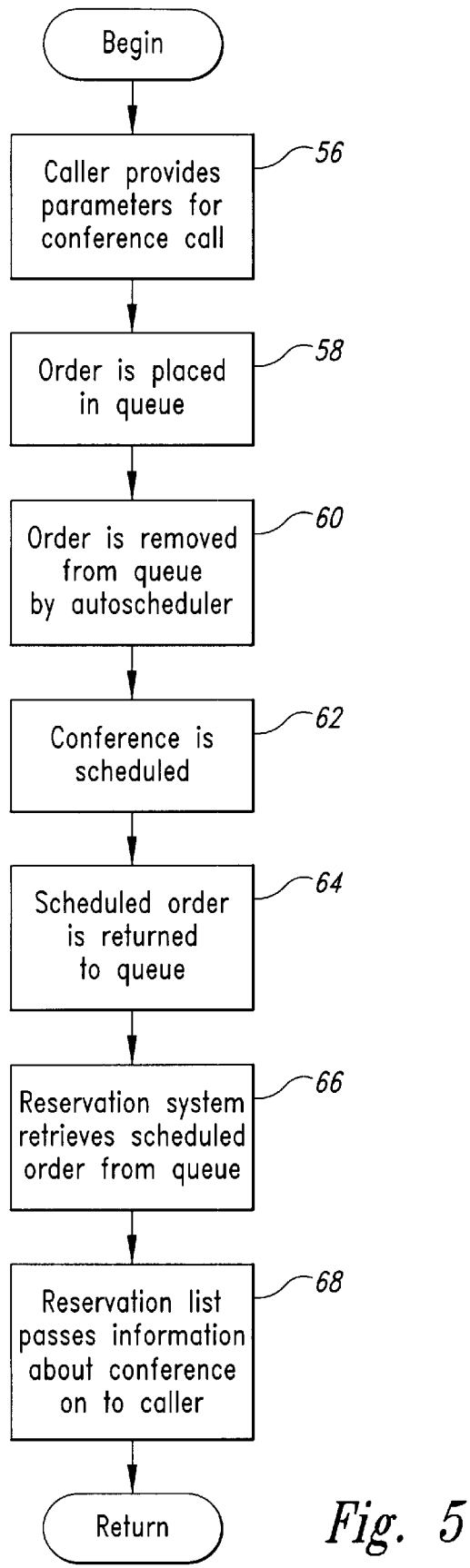
FIG. 5 is a flowchart illustrating the steps that are performed to reserve resources for an audio conference.

FIG. 4 is a block diagram that shows the flow of data between the client program 20 of the reservation system and the auto-scheduler 28. FIG. 5 depicts a flowchart of the steps that are performed to realize scheduling of a reservation system in a preferred embodiment of the present invention. These two figures will be described in conjunction with each other. A reservation request begins by a caller calling into the call center that handles the audio conferencing and reaching a reservationist (step 56 in FIG. 5). Typically, a reservationist is an agent within the call center who is responsible for scheduling audio conferences. The caller may be the moderator or lead of the audio conference or may be, instead, merely a scheduling party in the audio conference.

The reservationist prompts the caller for information regarding the conference. The information may include the start date, start time, end date and end time of the audio conference. The reservationist will also prompt the caller to identify the call type that is to be used to realize the conference. These call types identify whether participants in the conference are to call in on a toll-free number, a toll number or on a private exchange number. Call types also identify whether the conference is to be initiated by an agent who calls out of the call center to each of the participants. The caller is prompted for identification of a customer to whom the audio conference is to be charged. The caller will be asked for the total number of participants in the conference and whether the caller has a requested phone number or not.

The caller may also specify certain conferencing features. These features may include different conference entry options. For example, when a participant enters a conference, the participant may be announced, alternatively, a tone may be played when a participant enters. In another alternative, the tone and the announcement are used in conjunction. Still further, a participant may silently enter the conference. Other features enable participants to hear music when they are placed on hold. Participants may be designated as "listen only" participants, such that they can hear what other participants are saying but may not speak as part of the conference. Late arriving parties may be announced.

Different levels of service (a "product type") may be specified for a conference. For example, unattended service, standard service or premiere service may be requested. Each of these levels of service may include certain features and certain available options. The unattended level of service has no agent attending the audio conference. The standard level of service has an agent attending the audio conference as does the premiere level of service. The premiere level of service differs in that it has a higher number of features involved. With the premiere level of service, additional features such as participant screening, conference monitoring, sub-conferencing and polling may be provided. Instant replay service and facsimile service may also be available to certain levels of service. Other services include translation services, conference recording services, the generation of participant lists, tape playback and transcription services.

The parameters provided by the caller are encapsulated in a reservation request 48 that is forwarded to a queue 50 (step 58 in FIG. 5). The queue 50 is realized as a table within the database 18. Those skilled in the art will appreciate that other types of buffers may be used. The queue 50 contains a list of audio conferences that are currently waiting to be scheduled. These reservation requests associated with the audio conferences waiting to be scheduled are flagged to indicate whether they represent manually scheduled conferences or automatically scheduled conferences. The auto-scheduler 28 removes the reservation request 48 from the queue 50 (step 60 in FIG. 5). The reservation requests may have priorities such that higher priority requests are removed from the queue before lower priority requests. The auto-scheduler then schedules the audio conference within a scheduling grid 52 (step 62 in FIG. 4). The scheduling grid 52 indicates what audio conferencing resources are reserved at specified times. In some instances, the scheduling of the conference fails and a failure message is returned to the client program 20. The scheduled order 54 that encapsulates the information about the audio conference is returned to the queue 50 by the auto-scheduler 28 (step 64 in FIG. 5). The client program 20 retrieves the scheduled order 54 from the queue 50 (step 66 in FIG. 5). The scheduled order 54 holds information about the audio conference including the phone number or phone numbers that are to be used by participants to enter the conference, a conference ID and the time and date for the conference. The reservationist passes the information contained within the scheduled order 54 on to the caller so that the caller has a confirmation that the conference has been scheduled and has a phone number or phone numbers to be used by participants to enter the conference (step 68 in FIG. 5).

A caller may request that an audio conference be scheduled as soon as possible. In such an instance, the conference will be scheduled for twenty minutes after the current time and date. Furthermore, a caller may request that the reservationist initiate the conference immediately. Such a begin dialing out and start time reservation indicates that the conference is to be scheduled without any setup time and that the reservationist is to begin setting up the conference as soon as possible.

A caller may request the scheduling of recurring audio conference calls. Such recurring audio conference calls constitute a sequence of conferences with the same or similar moderators, participants that occur at a specified day/time during a year. For example, a recurring audio conference call may be scheduled for 9:00 AM for the first Monday of every month for one year. When a caller requests a recurring call, the data range over which the series of conferences are to occur must be specified along with the day and time for the conferences. The caller must additionally specify the call frequency (i.e., weekly, bi-weekly, or monthly).

Figure 6:
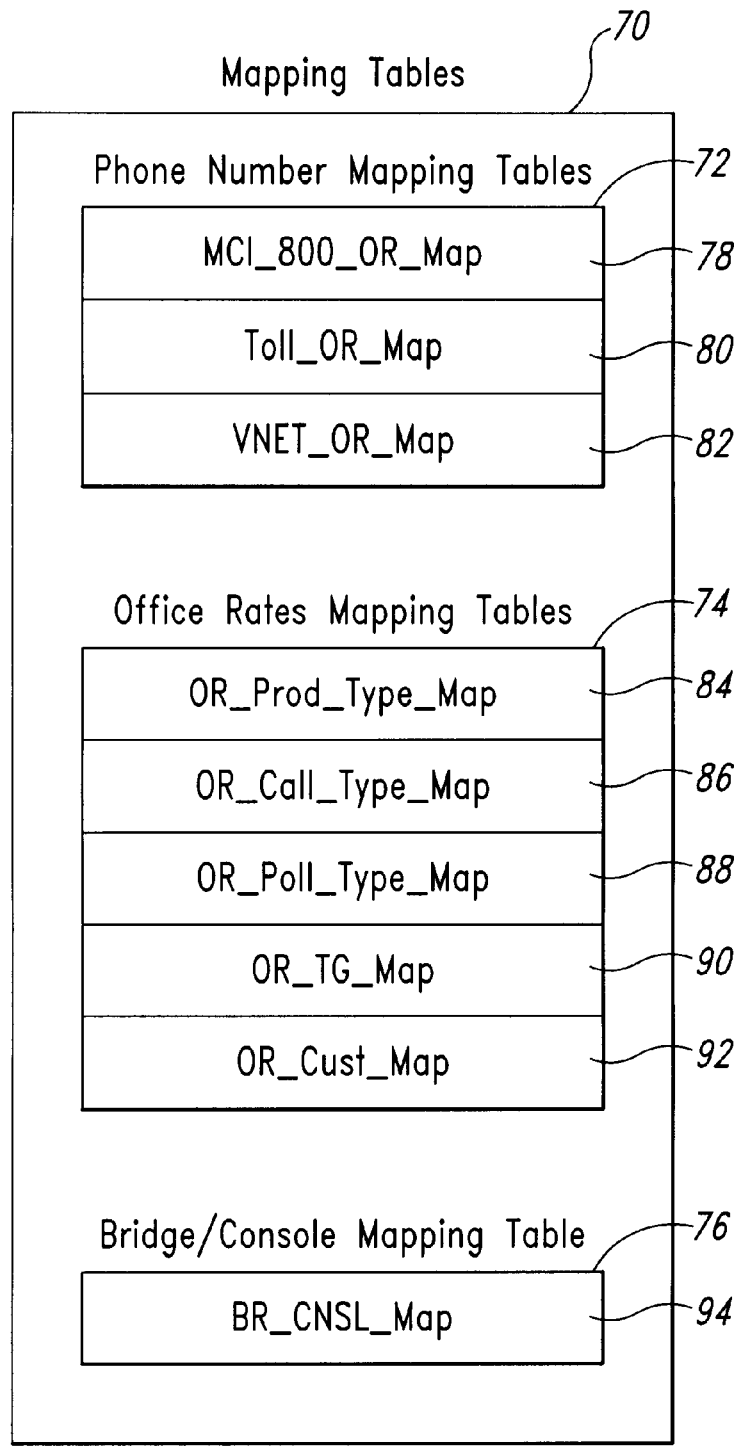
FIG. 6 depicts the mapping tables that are used by the auto-scheduler.

As was mentioned above, the database 18 holds a number of mapping tables. FIG. 6 depicts these mapping tables 70. The mapping tables 70 may be categorized into three categories: phone number mapping table 72, office routing mapping table 74, and bridge/console mapping table 76. The phone number mapping tables 72 map the phone numbers to office routes. The MCI_800_OR_Map 78 maps 800 numbers to office routes. The Toll_OR$_{13}$ Map 80 maps toll phone numbers to office routes. The VNET_OR_Map 82 maps VNET private exchange numbers to office routes. The office routing mapping tables 74 map office routes to conference attributes. The OR_Prod_Type_Map 84 maps office routes to product type. The OR_Call_Type_Map 86 maps office routes to call type. The OR_Poll_Type_Map 88 maps office routes to poll type. The OR_TG_Map 90 maps office routes with trunk groups. Lastly, the OR_Cust_Map 92 maps customers with office routes. The BR_CNSL_Map 94 maps consoles to bridges and specifies the connect type of each console.

Figure 7:
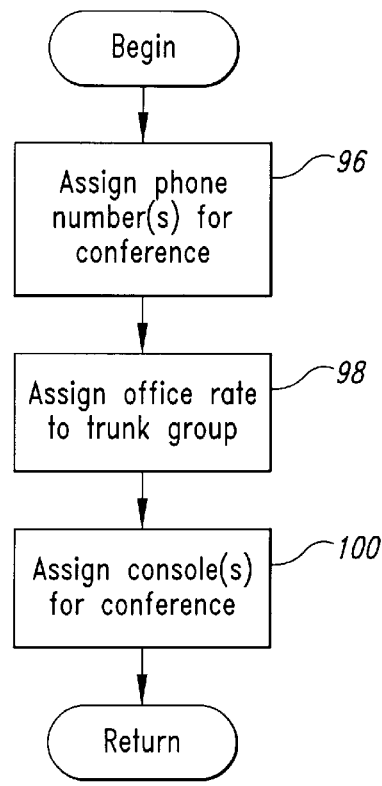
FIG. 7 is a flowchart illustrating the steps that are performed to reserve resources for an audio conference.
Figure 8:
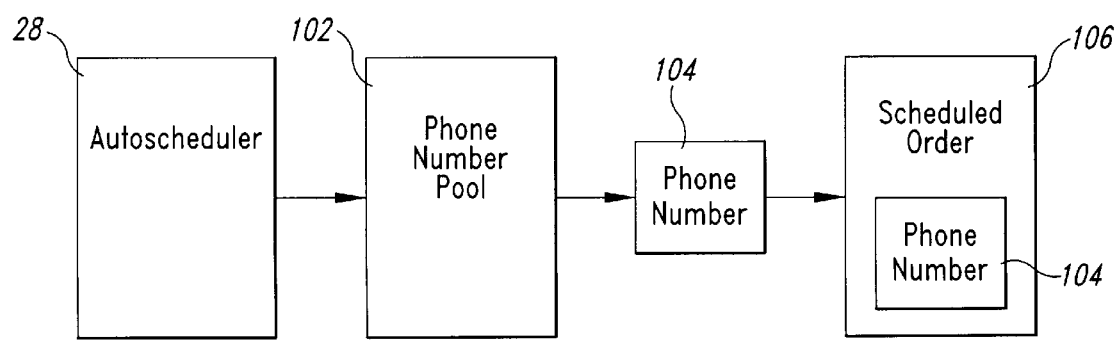
FIG. 8 is a block diagram illustrating how phone number pools are used in the preferred embodiment of the present invention.
Figure 9:
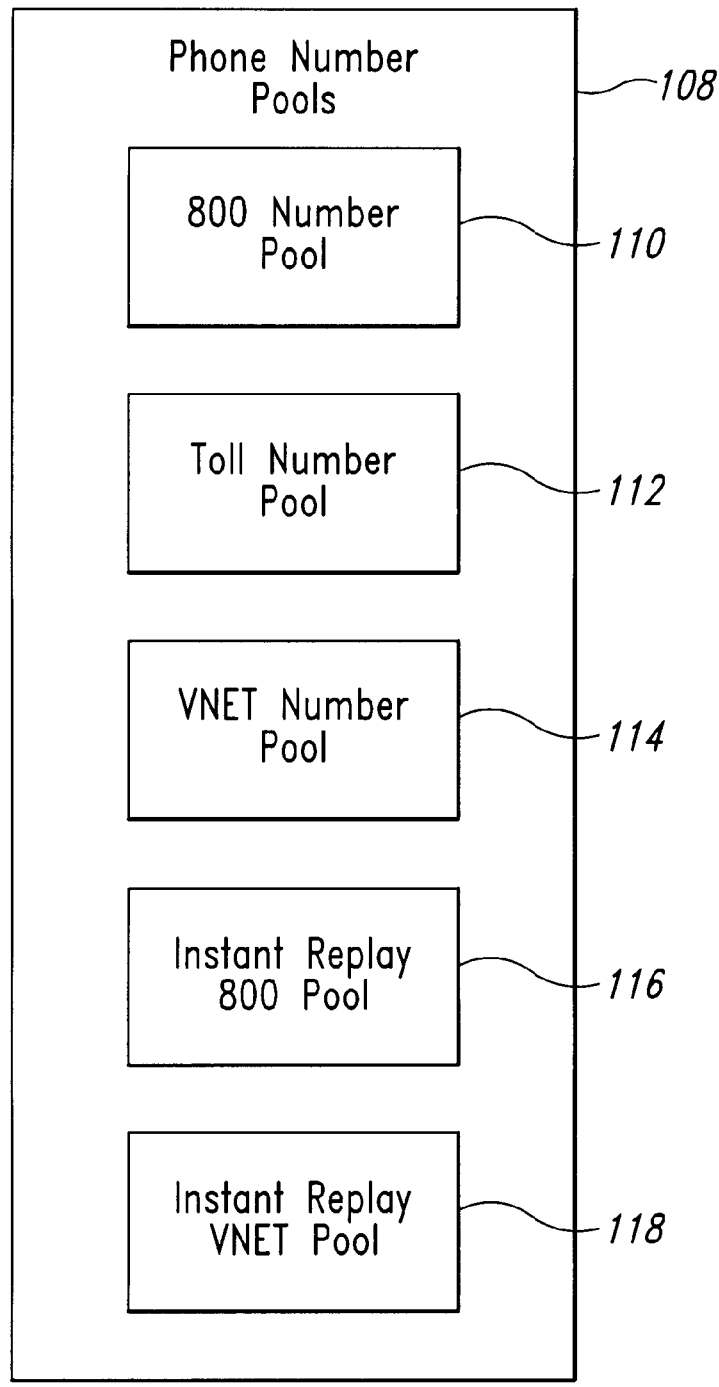
FIG. 9 is a diagram illustrating the different types of phone number pools.

The scheduling of an audio conference by the auto-scheduler 28 may be viewed as proceeding in three stages as depicted in FIG. 7. In the first stage, phone numbers are assigned for an audio conference (step 96 in FIG. 7). This step is performed by the telephone number assignment subsystem 32 of the auto-scheduler 28. One or more phone numbers may be assigned for each conference. The phone numbers may be assigned independently or interdependently from the other resources. Certain phone numbers may be tied to particular office routes and consoles, and thus, the phone numbers and resources are interdependent. The next step is to assign an office route for the audio conference to a trunk group (step 98 in FIG. 7). Lastly, one or more consoles are assigned for the audio conference (step 100 in FIG. 7). Steps 98 and 100 are performed by the bridge/console assignment subsystem 34 of the auto-scheduler 28. In assigning a phone number or phone numbers for a conference (see step 96 in FIG. 7), the auto-scheduler 28 accesses a phone number pool 102 (see FIG. 8). The phone number pool 102 holds a list of phone numbers that are potentially eligible for use in an audio conference. A given phone number 104 is selected from the phone number pool 102 and included as part of the scheduled order 106. A number of different phone number pools are utilized by the auto-scheduler 28. FIG. 9 depicts the phone number pools 108 that are utilized. The phone number pools 108 include an 800 number pool 110. FIG. 10 shows the format of the 800 number pool 110 of FIG. 9 in more detail. The 800 number pool holds entries that include an 800 phone number 111 and a pool type designation 113. The pool type designation may be a "regular" designation 115, which indicates that the phone number is available for regular conferencing. The pool type 113 may also include a recurring designation 119, which indicates that the 800 number is designated for use in a recurring conference call or may include a crisis designation 117, which indicates the number is used as a crisis audio conference number.

The phone number pools 108 (FIG. 9) also include a toll number pool 112. The format of the toll number pool 112 is depicted in FIG. 11. Each entry includes a toll phone number 122 and a pool type designation 124. The pool type designations 124 may be a regular designation 126, a crisis designation 128 or a recurring designation 130 (like those found in the 800 number pool).

The phone number pool (FIG. 9) 108 additionally includes a VNET number pool 114 that holds VNET (i.e., private exchange) phone numbers. As depicted in FIG. 12, each entry within the VNET number pool 114 may include a VNET number 132 and a pool type designation 134. The pool type designations may be specified as a regular designation 136 or a recurring designation 138.

The phone number pools 108 (FIG. 9) also include two instant replay pools 116 and 118. The instant replay 800 pool 116 contains a list of 800 numbers that are to be used for instant replay orders. The instant replay VNET pool 118 contains a list of VNET numbers used solely for instant replay orders.

Time buffers are maintained for phone numbers. FIG. 13 depicts an example of a portion of a time buffer 140. The time buffer 140 holds a designation of a phone number 142 and holds a sequence of time slots that specify whether the phone number is scheduled or available for that time slot. In the example shown in FIG. 13, time slots 146, 148, and 150 constitute 15 minute slots and information regarding whether a phone number is available for that slot or not is designated. It should be appreciated, that the time buffer may be specified for multiple days and may be specified for an entire year. Furthermore, separate time buffers may be provided for different categories of phone numbers.

When a caller requests that the audio conference use a toll-free number, then a toll-free number from the toll number pool 112 (FIG. 9) is assigned. Tollfree numbers may be reserved for specific customers or moderators. If a toll-free number is reserved for a moderator, the toll-free number may be assigned only to conferences for that moderator. Similarly, if a toll-free number is reserved for a customer, the toll-free number may be assigned only to conferences for the designated customer.

If the caller requests a VNET or private exchange number, then a VNET or private exchange number is assigned for the conference. The VNET number pool 114 will be used in obtaining an appropriate VNET number.

Similarly, if the caller requests a toll number, a toll number will be assigned from the tool number pool 112.

It should be appreciated that a caller may request a particular phone number and the reservationists will determine whether that phone number is available and assign it if it is available. Phone numbers may be dedicated to particular customers and used only by those customers.

Figure 14:
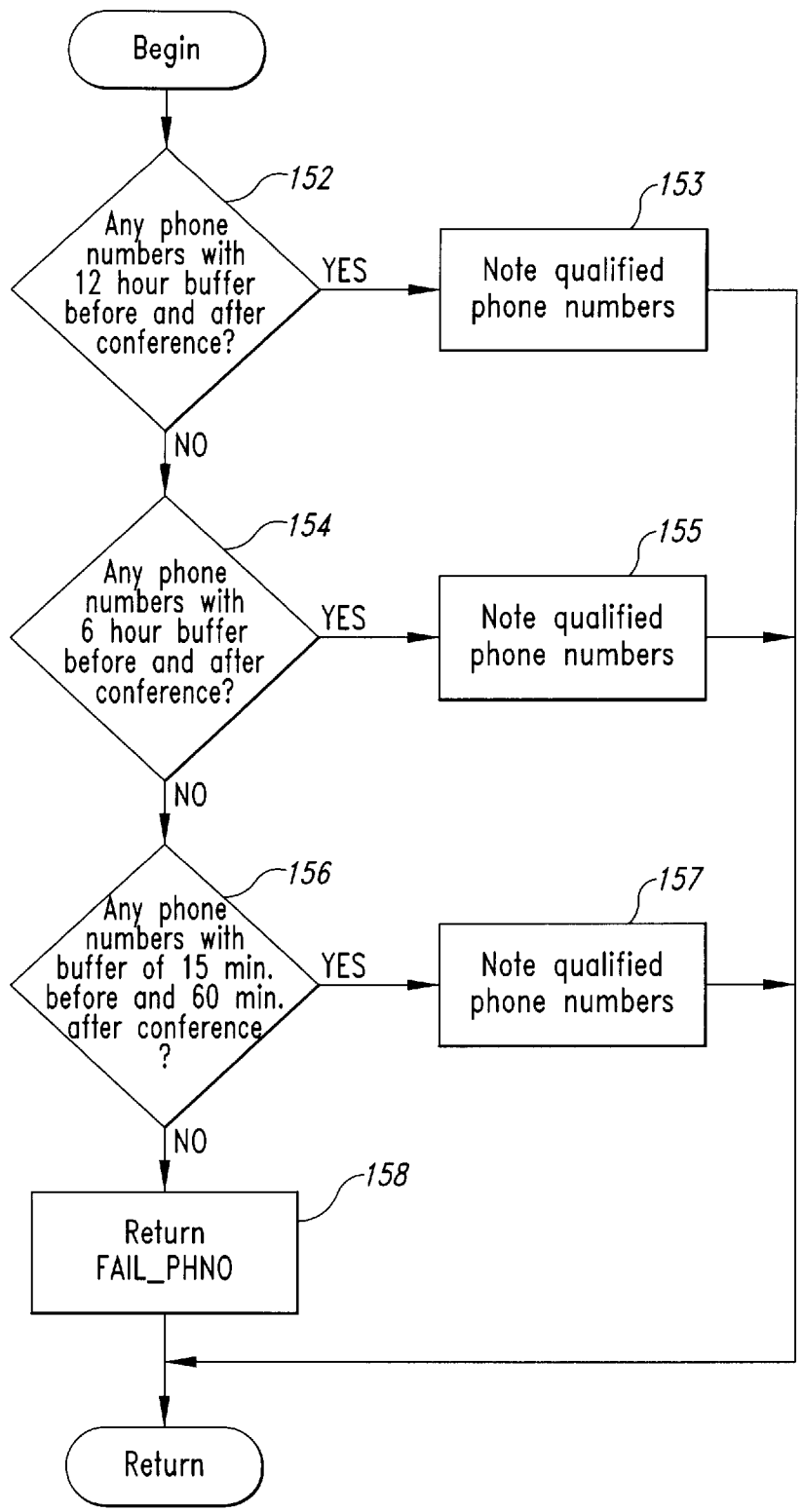
FIG. 14 depicts the flowchart of the steps that are performed to identify qualified phone numbers.

In assigning a non-dedicated phone number to a conference, the time buffer 140 (FIG. 13) is accessed. FIG. 14 illustrates the steps that are performed in using the time buffers. Initially, the auto scheduler 28 looks for any phone numbers within the specified number pool that have a 12-hour buffer both before the start time of the audio conference and after the end time of the audio conference. The buffers constitute windows of availability wherein the phone numbers are available. Hence, if there are any phone numbers with 12-hour buffers before and after a conference (see step 152 in FIG. 14), the qualified phone numbers are noted (step 153 in FIG. 14) and the auto scheduler chooses from the qualified phone numbers. However, if no such phone numbers are available, the auto scheduler 28 determines whether there are any phone numbers within the pool that have a 6-hour buffer before and after the conference (step 154 in FIG. 14). Any such phone numbers are noted and one of the noted phone numbers may be assigned to the audio conference. If a phone number with a 6-hour buffer is not available, the system looks for any phone numbers with a buffer of 15 minutes before the start time of the conference and a buffer of 60 minutes after the scheduled end time of the conference (step 156 in FIG. 14). Any such phone numbers are noted as qualified phone numbers (step 157). However, if such phone numbers are not available, the FAIL_PHNO message is returned (step 158 in FIG. 14) to indicate that the assignment of a phone number has failed and, thus, the conference has failed to be scheduled.

As was mentioned above, after the phone numbers for a conference have been assigned, the office route for the conference is assigned (see step 98 in FIG. 7). Office routes are either dedicated to a particular customer or general such that they may be used by all non-dedicated customers. The scheduling of office routes is a constrained optimization process that consists largely of two steps. First, a list of qualified office routes is determined and then the office routes within the list are scored. The highest scoring office route is selected for the audio conference.

Figure 15:
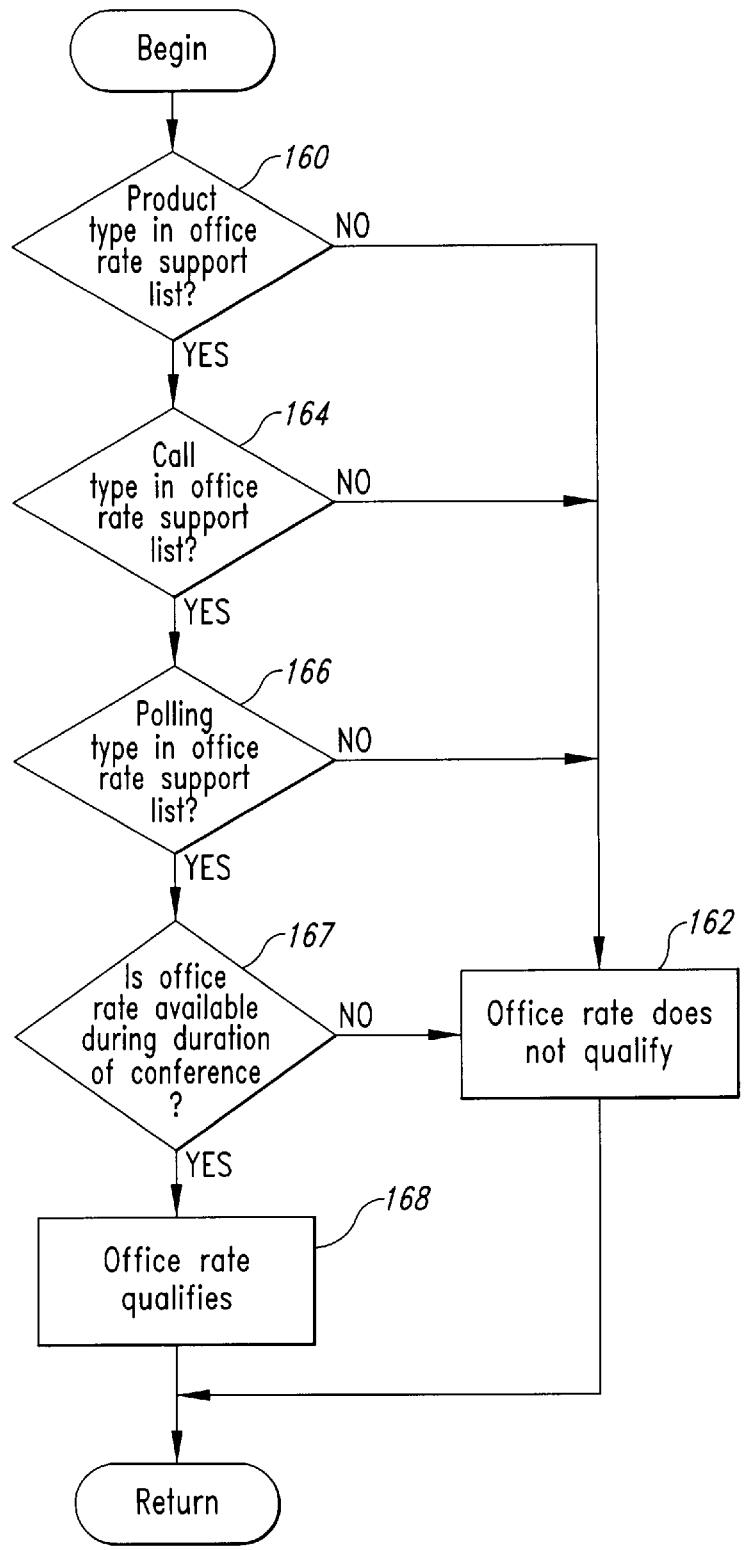
FIG. 15 is a flowchart illustrating the steps that are performed to identify qualified office routes.

FIG. 15 illustrates the steps that are performed to determine whether an office route is qualified or not. Each bridge within the audio conferencing system has a set of attributes that enable it to support or not support certain types of conferences. These attributes include conference-type (i.e., attended or unattended), call type, customer type, and ability to support certain features. In determining qualified office routes, each of the bridges within the respective office route must have the proper attributes for handling the conference call.

It is first determined whether the office route supports the product type of the conference (step 160 in FIG. 15). The product type is either unattended, standard or premiere (corresponding to the level of service that is provided). If the office route does not support the product type of the conference, the office route does not qualify (step 162 in FIG. 15). If, however, the office route supports the product type of the conference, it is determined whether the office route supports the call-type of the conference (step 164 in FIG. 14). As was mentioned above, the call types may be dial-out, toll-free, VNET, or toll. If the office route does not support the call type, the office route does not quality (step 162 in FIG. 14). On the other hand, if the office route does support the call type, it is determined whether the polling type (if any) used for the conference is supported by the office route (step 166 in FIG. 14). If the polling type is not supported by the office route, the office route does not qualify (step 162 in FIG. 14). The qualifying office routes must be available (i.e., have capacity) during the time frame in which the conference is to be scheduled. A separate time buffer for office routes or trunk groups may be provided to ensure that office routes qualify. Hence, in step 167 of FIG. 15, the time buffer is used to determine if the office route is available for the duration of the audio conference. If not, the office route does not qualify (step 162 in FIG. 15). If the office route is available, the office route qualifies (step 165 in FIG. 15). The steps shown in FIG. 14 are performed for all the candidate office routes. This results in a list of qualified office routes.

Figure 16:
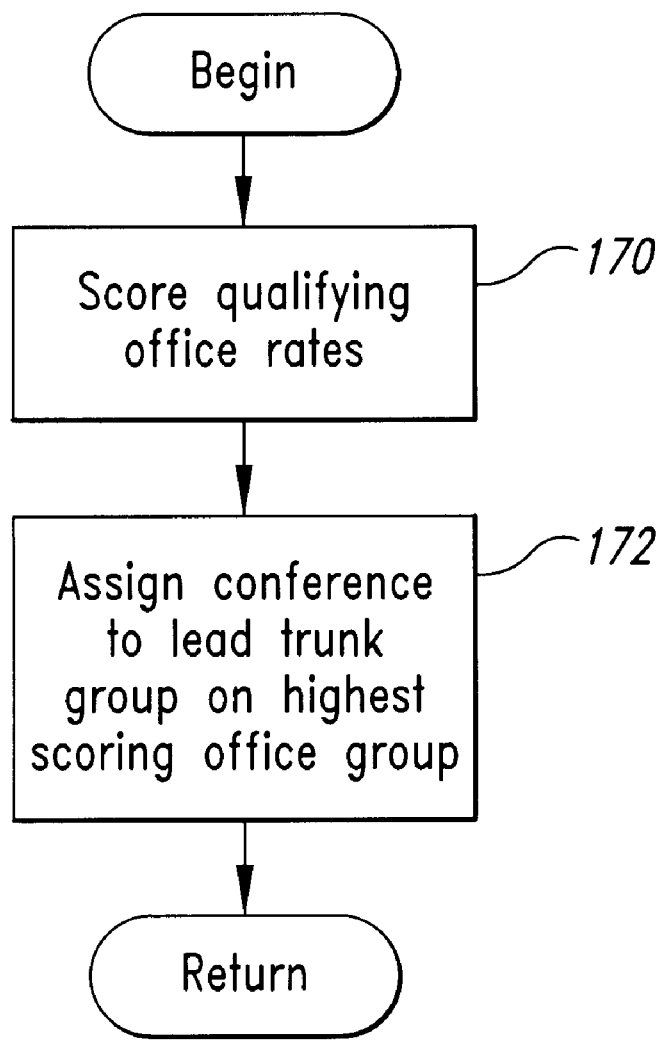
FIG. 16 is a flowchart illustrating the steps that are performed to score and assign office routes to an audio conference.

The second stage of determining office routes involves optimization. The steps shown in FIG. 16 are performed. Each qualifying office route is scored (170, FIG. 15) by applying a linear scoring scheme wherein each weight for each parameter is adjustable and the scoring scheme applies an objective function. Those skilled in the art will appreciate that various functions may be utilized to score the qualifying office routes. In the preferred embodiment of the present invention, the function utilizes parameters such as measurements of capacity like lead bridge available port capacity and percent console utilization. The scoring function seeks to perform load balancing across bridges and consoles and seeks to prevent resource assignment that would lead to conference calls overflowing from one bridge to another. The conference call is then assigned to the lead trunk group on the office route which receives the highest score (step 172 in FIG. 15).

The third step in scheduling the audio conference entails assigning a console to the conference (see step 100 in FIG. 7). The consoles that may be selected correspond to those that are connected to the bridges on the office route that is assigned to the conference. Each console has a set of properties associated with it. In particular, each console is associated with a call center and a skill level. A separate time buffer or console calendar is maintained for each console to specify the availability of the console as a function of date and time. This calendar is utilized to determine which of the consoles connected to the bridges and the office routes is best situated to service the conference call.

Two types of consoles are assigned to conferences: Coordinator consoles and setup consoles. Coordinator consoles are assigned to conferences for the duration of the call, including setup time. Setup consoles are assigned to conferences only for the duration of the setup time. Certain call types have both coordinator and setup consoles. Other call types have only coordinator consoles and some types have only setup consoles. Tables are provided in the database 18 to determine the types of consoles that are needed based upon call type.

Figure 17A:
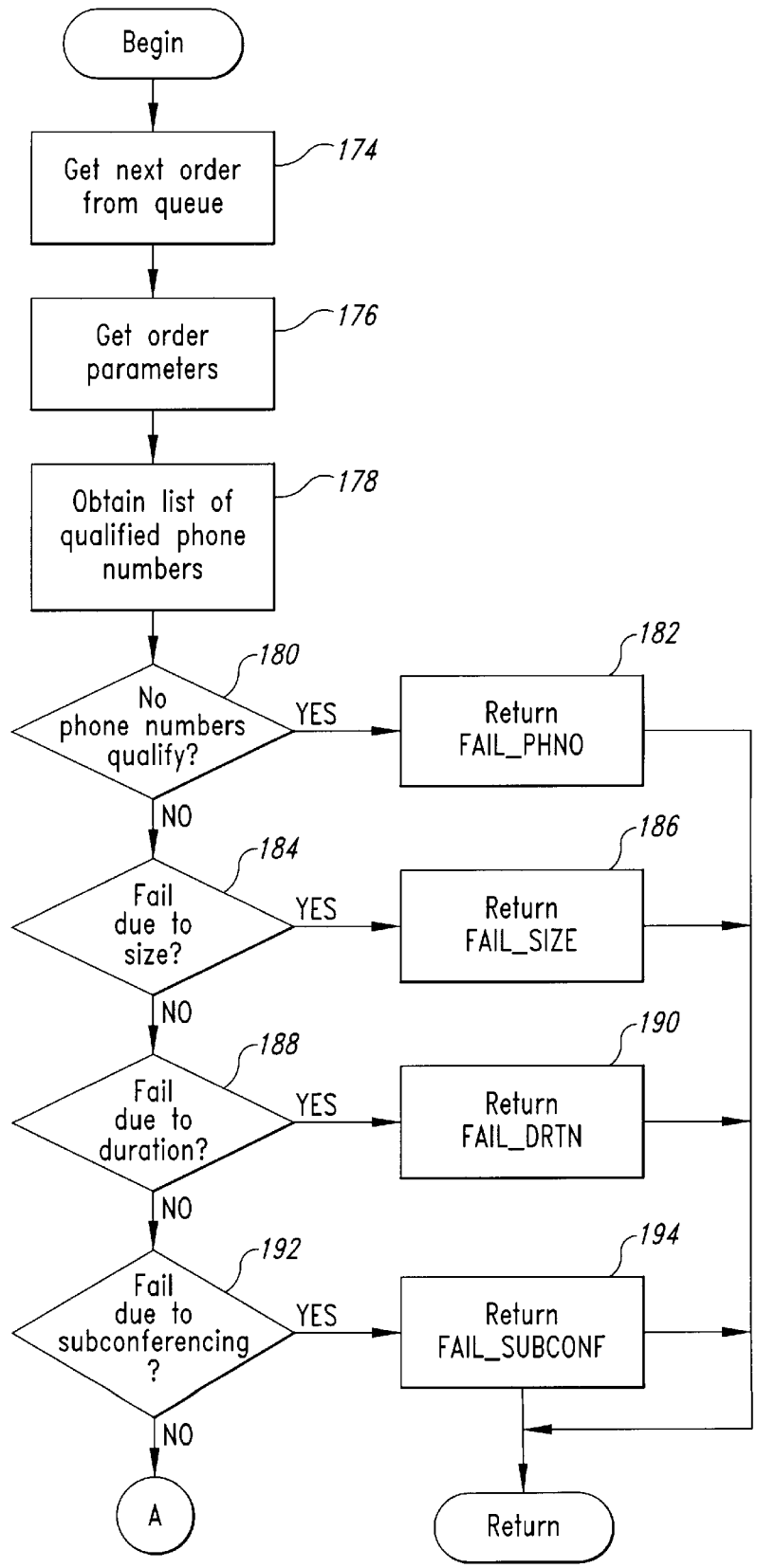
FIGS. 17A and 17B provide a detailed flowchart of the steps that are performed to schedule a reservation in the preferred embodiment of the present invention.
Figure 17B:
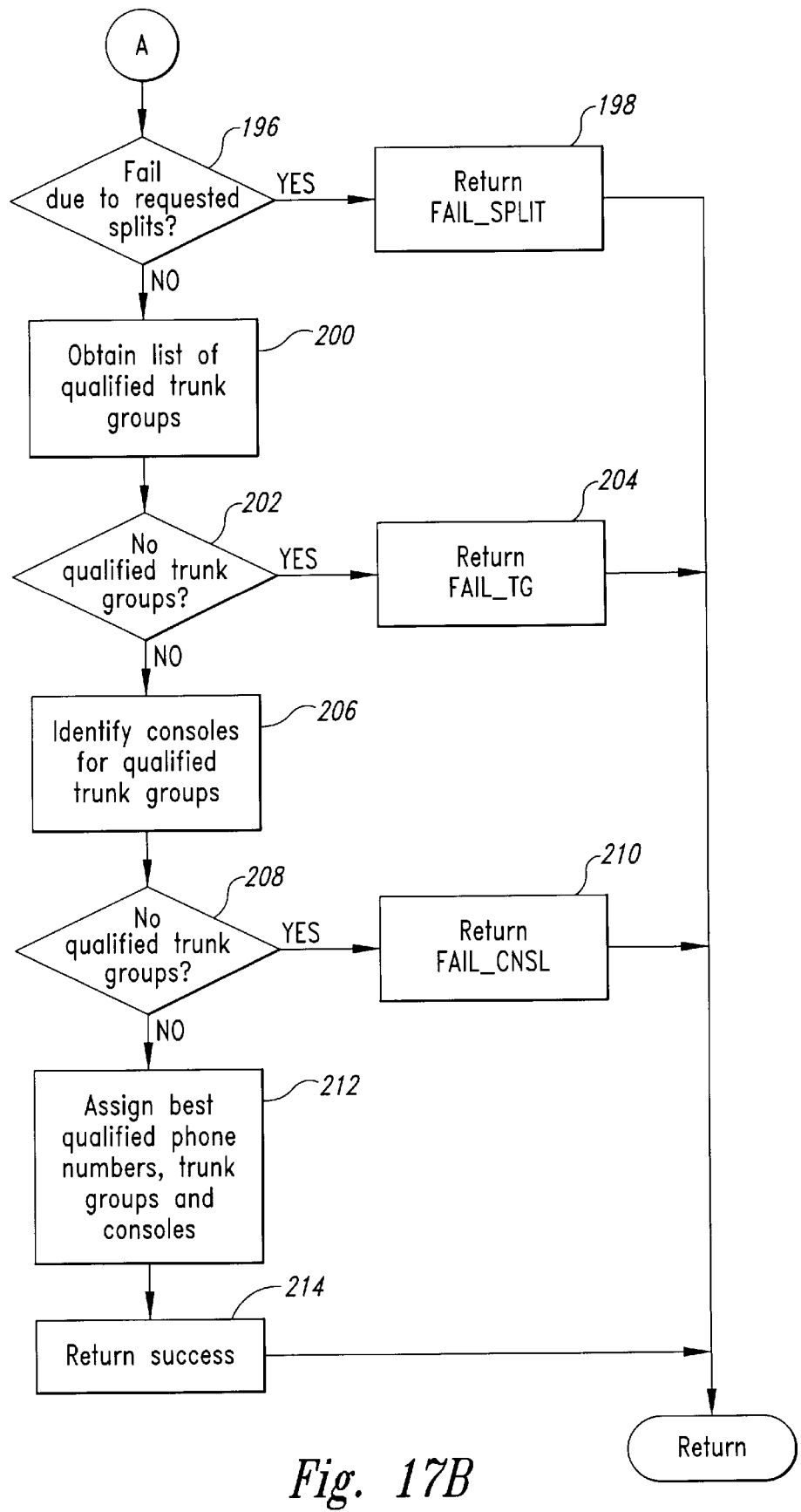

FIGS. 17A and 17B provide a more detailed overview of the steps that are performed in scheduling a conference with the auto-scheduler 28 of the preferred embodiment of the present invention. It should be appreciated that there may be order cancellations and conflicts with manually scheduled reservations. These are not explicitly depicted in the flowchart of FIGS. 17A and 17B. The process starts by the auto-scheduler 28 getting a next reservation request or order from the queue 50 (step 174 in FIG. 17A). The auto-scheduler 28 then obtains the order parameters from the order (step 176 in FIG. 17A) and proceeds to obtain a list of qualified phone numbers (step 178 in FIG. 17A). If no phone numbers qualify (step 180 in FIG. 17A), then the auto-scheduler returns a failed message (i.e., FAIL_PHNO) that indicates the failure due to the lack of qualifying phone numbers (step 182 in FIG. 17A). If there are qualifying phone numbers, the system checks whether the conference should not be scheduled because it includes too many participants (step 184 in FIG. 17A). If there are too many participants, the other scheduler 28 returns a FAIL_SIZE message (step 186 in FIG. 17A). In general, there is a maximum number of participants that may participate in a conference. When large numbers of participants are in use, multiple phone numbers may be utilized.

The auto-scheduler 28 also has a maximum duration for conferences. For example, audio conferences may not exceed 48-hours in duration. In step 188, the auto-scheduler 28 determines whether the conference request is for a conference of too great of a duration. In such a case, the FAIL_DRTN message is returned (step 190 in FIG. 17A). Certain sub-conferencing requests may not be handled by the auto-scheduler and thus the auto-scheduler may check whether the conference request should fail due to sub-conferencing (step 192 in FIG. 17A) in order to request that the conference be manually scheduled. The auto-scheduler returns the FAIL_SUBCONF message (step 194 in FIG. 17A).

In some instances, conference size exceeds the largest set of available ports in a single office route and the conference needs to be split over two or more office routes. In such cases, the reservationist requests the splitting of the conference and the auto-scheduler request will fail (see step 196 in FIG. 17B). The auto-scheduler 28 returns the FAIL_SPLIT message (step 198 in FIG. 17B).

The auto-scheduler 28 then proceeds to obtain a list of qualified trunk groups (step 200 in FIG. 17B). As was mentioned above, this process largely entails determining the qualified office groups and designating the lead trunk group of each such qualified office route as a qualified trunk. If there are no qualified trunks (i.e., not enough lines are available on the trunk groups) (see step 202 in FIG. 17B), the FAIL_TG message is returned (step 204 in FIG. 17B). Once the qualified trunk groups are determined, the consoles for the available trunk groups are identified (step 206 in FIG. 17B). If there are no qualified consoles (step 208 in FIG. 17B), the FAIL_CNSL message is returned (step 210 in FIG. 17B).

The auto-scheduler 28 then assigns the best qualified phone numbers, trunk groups and consoles as has been discussed above (step 212 in FIG. 17B). A SUCCESS message is returned (step 214 in FIG. 17B).

It should be appreciated that the auto-scheduler 28 does not enforce the reservation of resources for an audio conference at the time that audio conference takes place; rather the auto-scheduler ensures that the appropriate quantity of resources is reserved to facilitate the audio conference.

While the present invention has been described with reference to a preferred embodiment thereof, those skilled in the art will appreciate that various changes in form and detail may be made without departing from the intended scope of the present invention as defined in the appended claims. For example, a different computer configuration may be utilized to implement the present invention. Moreover, different rules may be applied to identify the optimal resources to be allocated for an audio conference.

We claim:

1. A method of reserving audio conferencing resources including a plurality of audio conferencing bridges for an audio conferencing system having trunk groups, the method comprising the computer-implemented steps of:

provising an automated scheduler for dynamically scheduling reservations of the audio conferencing resources;

receiving a request from a caller to schedule an audio conference having participants;

in response to said request, assigning at least one number from a pool of telephone numbers: and with the automated scheduler, identifying selected ones of the audio conferencing resources to be used in the audio conference and reserving the selected audio conferencing resources for use in the audio conference to be accessed by calling said assigned number.

2. The method of claim 1 wherein the identified ones of the resources to be used in the audio conference include a phone number that the participants in the audio conference may call to participate in the audio conference.

3. The method of claim 1 wherein the identified ones of the resources to be used in the audio conference include information that designates one of the trunk groups to be used in the audio conference.

4. The method of claim 1 wherein the request includes a start time and end time for the audio conference.

5. The method of claim 4 wherein the identifying step entails determining what audio conference resources are available from the start time to the end time.

6. The method of claim 1 wherein the identifying step entails determining optimal audio conference resources for servicing the request.

7. The method of claim 1, further comprising the step of providing a confirmation that the audio conference has been successfully scheduled to the caller.

8. The method of claim 7 wherein the request and the confirmation are realized during a single phone call with the caller.

9. A method of reserving audio conference resources including a plurality of audio conferencing bridges of an audio conferencing system, the method comprising the computer-implemented steps of:

receiving a request to schedule an audio conference at a given date and time, said audio conference having certain constraints;

in response to said request, assigning at least one number from a pool of telephone numbers:

examining the audio conferencing resources to determine available audio conferencing resources at the given date and time;

identifying which of the available audio conferencing resources fulfill the constraints of the audio conference as qualified audio conference resources; and selecting some of the qualified audio conference resources as the ones to be reserved for the audio conference to be accessed by calling said assigned number.

10. The method of claim 9 wherein the method further comprises the step of applying a linear scoring scheme to at least some of the audio conferencing resources to gauge optimality of the resources and wherein the selecting entails selecting based upon the scoring scheme.

11. The method of claim 9 wherein the request is made via a telephone call.

12. A method of scheduling telephone numbers and audio conferencing resources including a plurality of audio conferencing bndges for an audio conferencing system, the method comprising the computer-implemented steps of:

receiving a first request to schedule a first audio conference having participants;

determining and reserving a phone number for the first audio conference that the participants may call to participate in the first audio conference;

determining and reserving audio conferencing resources to be used for the first audio conference independently of the determining of the phone number for the first audio conference;

receiving a second request to schedule a second audio conference having participants; and determining and reserving a phone number and audio conferencing resources to be used for the second audio conference independently, such that the determining of the phone number determines the audio conferencing resources to be used for the second audio conference.

13. The method of claim 12 wherein the audio conferencing system has customers and the phone number and audio conferencing resources to be used for the second audio conference are reserved exclusively for a selected one of the customers.

14. In a computer system that interfaces with an audio conferencing system having audio conferencing resources including a plurality of audio conferencing bridges a method comprising the computer-implemented steps of:

providing an automated scheduler for scheduling reservations of the audio conferencing resources for audio conferences;

receiving a request to schedule a series of recurring audio conferences that occur at periodic intervals with common participants;

in response to said request, assigning at least one number from a pool of telephone numbers; and with the automated schedulers scheduling the series of recurring audio conferences such that audio conferencing resources are reserved for the series of recurring audio conferences to be accessed by calling said assigned number.

15. The method of claim 14 wherein the request specifies times and dates for the series of recurring audio conferences.

16. The method of claim 15 wherein the method further comprises the step of confirming availability of the audio conferencing resources during the times and dates specified by the request.

17. In a computer system, a computer-readable medium holding computer-executable instructions for performing a method of reserving audio conferencing resources including a plurality of audio conferencing bridges for an audio conferencing system having trunk groups, the method comprising the computer-implemented steps of:

providing an automated scheduler for scheduling reservations of the audio conferencing resources;

receiving a request from a caller to schedule an audio conference having participants;

in response to said request, assining at least one number from a pool of telephone numbers; and with the automated scheduler, identifying selected ones of the audio conferencing resources to be used in the audio conference and reserving the selected audio conferencing resources for use in the audio conference to be accessibly calling said assigned number.

18. The computer-readable medium of claim 17 wherein the identified ones of the resources to be used in the audio conference include a phone number that the participants in the audio conference may call to participate in the audio conference.

19. The computer-readable medium of claim 17 wherein the identified ones of the resources to be used in the audio conference include information that designates one of the trunk groups to be used in the audio conference.

20. The computer-readable medium of claim 17 wherein the request includes a start time and end time for the audio conference.

21. The computer-readable medium of claim 20 wherein the identifying step entails determining what audio conference resources are available from the start time to the end time.

22. The computer-readable medium of claim 17 wherein the identifying step entails determining optimal audio conference resources for servicing the request.

23. The computer-readable medium of claim 17 wherein the method further comprises the step of providing a confirmation that the audio conference has been successfully scheduled to the caller.

24. The computer-readable medium of claim 23 wherein the request and the confirmation are realized during a single phone call with the caller.

25. In a computer system, a computer-readable medium holding computer-executable instructions for performing a method of reserving audio conferencing resources including a plurality of audio bridges for an audio conferencing system the method comprising the computer-implemented steps of:

receiving a request to schedule an audio conference at a given date and time, said audio conference having certain constraints;

in response to said request, assigning at least one number from a pool of telephone numbers;

examining the audio conferencing resources to determine available audio conferencing resources at the given date and time;

identifying which of the available audio conferencing resources fulfill the constraints of the audio conference as qualified audio conference resources; and selecting some of the qualified audio conference resources as the ones to be reserved for the audio conference to be accessed by calling said assigned number.

26. The computer-readable medium of claim 25 wherein the method further comprises the step of applying a linear scoring scheme to at least some of the audio conferencing resources to gauge optimality of the resources and wherein the selecting entails selecting based upon the scoring scheme.

27. The computer-readable medium of claim 25 wherein the request is made via a telephone call.

28. In a computer system that interfaces with an audio conferencing system having audio conferencing rsources including a plurality of audio conferencing bridges, a computer-readable medium holding computer-executable instructions for performing a method comprising the computer-implemented steps of:

providing an automated scheduler for scheduling reservations of the audio conferencing resources for audio conferences;

receiving a request to schedule a series of recurring audio conferences that occur at periodic intervals with common participants;

in response to said request, assigning at least one number from pool of telephone numbers;

with the automated scheduler, scheduling the series of recurring audio conferences such that audio conferencing resources are reserved for the series of recurring audio conferences to be accessed by calling said assigned number.

29. The computer-readable medium of claim 28 wherein the request specifies times and dates for the series of recurring audio conferences.

30. The computer-readable medium of claim 28 wherein the method further comprises the step of confirming availability of the audio conferencing resources during the times and dates specified by the request.

31. In a computer system, a method of reserving audio conferencing resources for an audio conferencing system having trunk groups, comprising the computerimplemented steps of:

providing an automated scheduler for dynamically scheduling reservations of the audio conferencing resources; and applying a linear scoring scheme to at least some of the audio conferencing resources to gauge optimality of the resources.

32. The method of claim 31, wherein the method further comprises identifying, with the automated scheduler, selected ones of the audio conferencing resources to be used in the audio conference and reserving the selected audio conferencing resources for use in the audio conference.

33. The method of claim 31, wherein the method further comprises selecting some of the audio conferencing resources based upon the scoring scheme.

34. The method of claim 33, wherein the method further comprises receiving a request from a caller to schedule an audio conference having participants.

35. In a computer system, a method of reserving audio conferencing resources for an audio conferencing system having trunk groups, comprising the computer-implemented steps of:

providing an automated scheduler for dynamically scheduling reservations of the audio conferencing resources;

receiving a request from a caller to schedule an audio conference having participants;

with the automated scheduler, identifying selected ones of the audio conferencing resources to be used in the audio conference and reserving the selected audio conferencing resources for use in the audio conference; and applying a linear scoring scheme to at least some of the audio conferencing resources to gauge optimality of the resources and selecting some of the audio conferencing resources based upon the scoring scheme.

* * * * *